(12) United States Patent
Morita et al.

(10) Patent No.: US 6,298,031 B1
(45) Date of Patent: Oct. 2, 2001

(54) DISC PLAYER

(75) Inventors: Yuji Morita; Yoshihiro Seshime; Masashi Kurosawa, all of Saitama-ken (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/262,357

(22) Filed: Mar. 4, 1999

(30) Foreign Application Priority Data

Mar. 19, 1998 (JP) .................................................. 10-071009

(51) Int. Cl.⁷ .................................................. G11B 17/03
(52) U.S. Cl. .............................................................. 369/219
(58) Field of Search .................................... 369/221, 220, 369/219, 215, 176, 244, 247, 249

(56) References Cited

U.S. PATENT DOCUMENTS

| | | | | |
|---|---|---|---|---|
| 4,191,381 | * | 3/1980 | Stave | 369/75.2 |
| 5,172,367 | * | 12/1992 | Hinotani | 369/215 |
| 5,303,223 | * | 4/1994 | Sakaguchi et al. | 369/215 |
| 5,517,483 | * | 5/1996 | Choi | 369/255 |
| 5,677,904 | * | 10/1997 | Yokota et al. | 369/244 |
| 5,719,848 | * | 2/1998 | Ikegame | 369/219 |
| 5,790,509 | * | 8/1998 | Noguchi | 369/215 |
| 5,926,451 | * | 7/1999 | Sofue | 369/219 |
| 5,933,406 | * | 8/1999 | Ikegame | 369/247 |
| 5,995,479 | * | 11/1999 | Takizawa et al. | 369/219 |
| 6,044,057 | * | 3/2000 | Park et al. | 369/219 |
| 6,137,765 | * | 3/2001 | Saito | 369/219 |
| 6,163,416 | * | 3/2001 | Uekusa et al. | 359/813 |
| 6,172,946 | * | 4/2001 | Furukawa et al. | 369/47.48 |
| 6,172,949 | * | 4/2001 | Ogata | 369/32 |
| 6,175,544 | * | 4/2001 | Shiomi | 369/219 |
| 6,178,155 | * | 4/2001 | Ueda et al. | 369/244 |

FOREIGN PATENT DOCUMENTS

| | | |
|---|---|---|
| 63071934 | 4/1988 | (JP) . |
| 10031827 | 2/1998 | (JP) . |

OTHER PUBLICATIONS

EPO Search Report, Jun. 28, 2000.

* cited by examiner

*Primary Examiner*—David L. Ometz
*Assistant Examiner*—Franklin D. Altman, III
(74) *Attorney, Agent, or Firm*—Arent Fox Kintner Plotkin & Kahn, PLLC

(57) ABSTRACT

A disk player comprises a turntable for rotatably holding an optical disc; an optical pickup for recording information into and reading information from the optical disc, an elongated guide shaft arranged in a predetermined moving direction of the optical pickup for guiding the optical pickup to move in said predetermined direction, a pivotable chassis for mounting the turntable, the optical pickup and the elongated guide shaft, a cartridge holder for receiving and holding a cartridge containing the optical disc. In particular, an adjustment mechanism is provided on the pivotable chassis for adjusting a positional relationship between the optical pickup and the turntable by moving one end of t he elongated guide shaft in a plane which is generally parallel with a recording surface of the optical disc.

3 Claims, 5 Drawing Sheets

DISC PLAYER

BACKGROUND OF THE INVENTION

The present invention relates to a disc player for recording information into and reproducing information from an optical disc, in particular to a disc player having an adjustment mechanism for adjusting a positional relationship between an optical pickup and a turntable within the disc player.

Conventionally, an optical pickup of a disc player is used to converge a laser beam onto an optical disc so as to record a great amount of information on the recording surface of an optical disc. Meanwhile, with the use of the optical pickup, a reflected light from the optical disc is directed and converged onto a photodetector so as to reproduce the information previously recorded on the optical disc.

The above optical disc is mounted on a turntable. which is driven by a spindle motor provided within the disc player. In order to ensure a correct information recording and information reproducing, it is necessary to perform a tracking control so that a laser beam may constantly trace an information track formed on the recording surface of an optical disc. During such tracking control, a laser beam from a laser diode is divided by an optical element (called grating) into one main-beam and two sub-beams. The two sub-beams are directed to the information recording surface of an optical disc at an inclined angle with respect to a tangential line of an information track. Then, two reflected lights from the optical disc are detected by two photodetectors so as to produce a difference between two outputs from the two photodetectors, thereby enabling a desired tracking control for both the information recording and the information reproducing.

However, with a disc player having a servo system in which the position of an optical pickup is movable in a radial direction of an optical disc, the position of the grating within the optical pickup is apt to deviate from the radial line direction, due to some unavoidable precision errors possibly caused in an assembling process for assembling a disc player. As a result, a tangential direction of an information track and the two sub-beams are likely to deviate from predetermined angles, making it impossible to perform a correct tracking control. For this reason, it is necessary to provide an adjusting system for correcting the above-discussed deviations.

A first example for the above adjustment may be achieved by adjusting a lens position in an optical pickup, so that the optical pickup may exactly trace along the radial direction of an optical disc.

A second example for the above adjustment is not to adjust a lens position in an optical pickup, instead, a fixing screw for adjusting a spindle motor is loosened to adjust the position of said spindle motor, so as to enable the optical pickup to exactly trace in the radial direction of an optical disc. Upon completion of such adjustment, the fixing screw is again screwed up, thereby enabling the said spindle motor to be secured in a correct position.

However, with the above first example according to a prior art, it is necessary that all the elements for forming the servo system be made with a high precision in size and that an assembling operation for attaching the servo system to the disc player be conducted with a high assembling precision. Further, even if people could try to make all the elements (for forming the servo system) with a high precision, some sorts of size errors are in fact difficult to avoid, hence making it indispensable to perform fine adjustment for the optical pickup.

On the other hand, with the above second example according to a prior art, the positional adjustment between the disc information recording surface and the optical pickup should be completed not only by adjusting the positions of the spindle motor and the turntable, but also by adjusting the optical disc in very direction in order to eliminate all kinds of possible inclinations. As a result, the adjustment operation is troublesome and time consuming.

SUMMARY OF THE INVENTION

It is an object of the present invention to provide a disc player having an adjustment mechanism for adjusting a positional relationship between an optical pickup and a turntable, so that a grating within the optical pickup may function properly, thereby solving the above-mentioned problems peculiar to the above-mentioned prior arts.

According to the present invention, there is provided an improved disk player comprising: a turntable for rotatably holding an optical disc; an optical pickup for recording information into and reading information from the optical disc; an elongated guide shaft arranged in a predetermined moving direction of the optical pickup for guiding the optical pickup to move in said predetermined direction; a pivotable chassis for mounting the turntable, the optical pickup and the elongated guide shaft; a cartridge holder for receiving and holding a cartridge containing the optical disc. In particular, an adjustment mechanism is provided on the pivotable chassis for adjusting a positional relationship between the optical pickup and the turntable by moving one end of the elongated guide shaft in a plane which is generally parallel with a recording surface of the optical disc.

In one aspect of the present invention, the adjustment mechanism includes an adjusting plate made of a resin or a metal, said resin or metal adjusting plate including a plastically deformable portion which is plastically deformable during said adjustment effected by the adjustment mechanism.

In another aspect of the present invention, the adjusting plate is pivotably provided on one side of the elongated guide shaft close to the rear of the pivotable chassis.

In further aspect of the present invention, the adjusting plate includes a front portion and a rear portion, the front portion will be covered up by a cartridge after the cartridge has been inserted into the cartridge bolder, while the rear portion is located on the outside of the inserted cartridge.

In a still further aspect of the present invention, the front portion of the adjusting plate includes a pivot fulcrum permitting a free pivotal movement of the adjusting plate, and an engaging portion for upwardly clamping one end of the guide shaft in a direction generally perpendicular to the axis of the guide shaft.

The above objects and features of the present invention will become better understood from the following description with reference to the accompanying drawings.

DETAILED DESCRIPTION OF THE PREFERRED EMBODIMENTS

Figure 1:
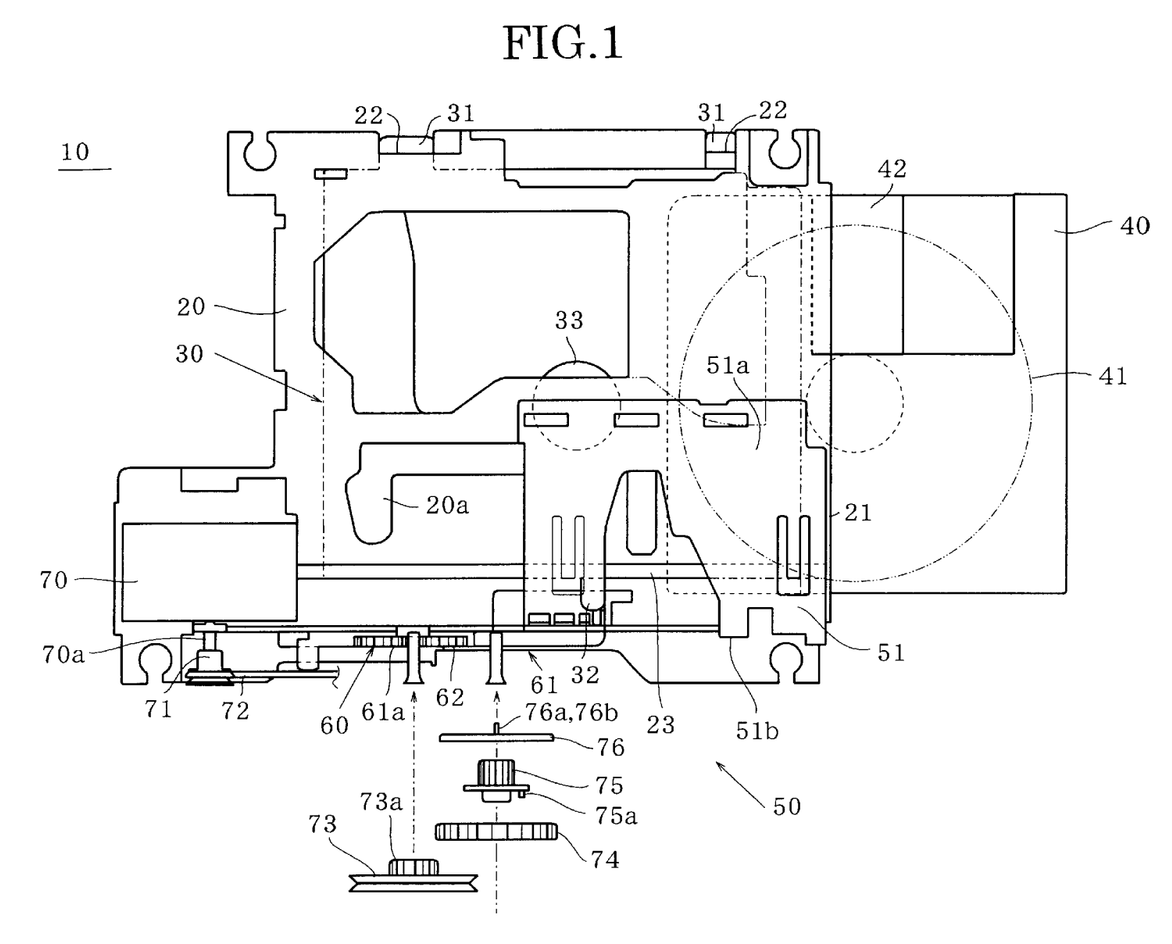
FIG. 1 is a front view schematically indicating a disc player made according to a preferred embodiment of the present invention.
Figure 2:
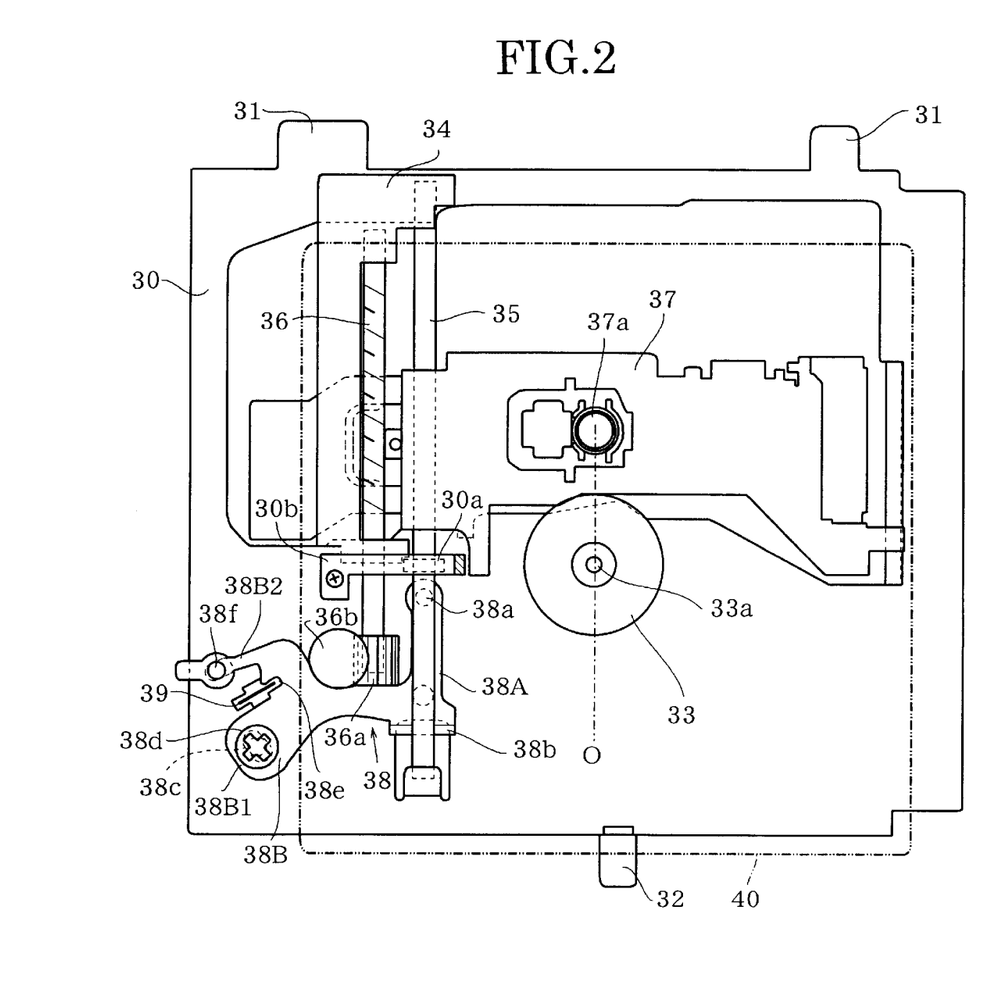
FIG. 2 is a front view schematically indicating a pivotable chassis for use in the disc player of FIG. 1, which chassis includes an adjusting mechanism for adjusting a positional relationship between an optical pickup and a turntable.
Figure 3:
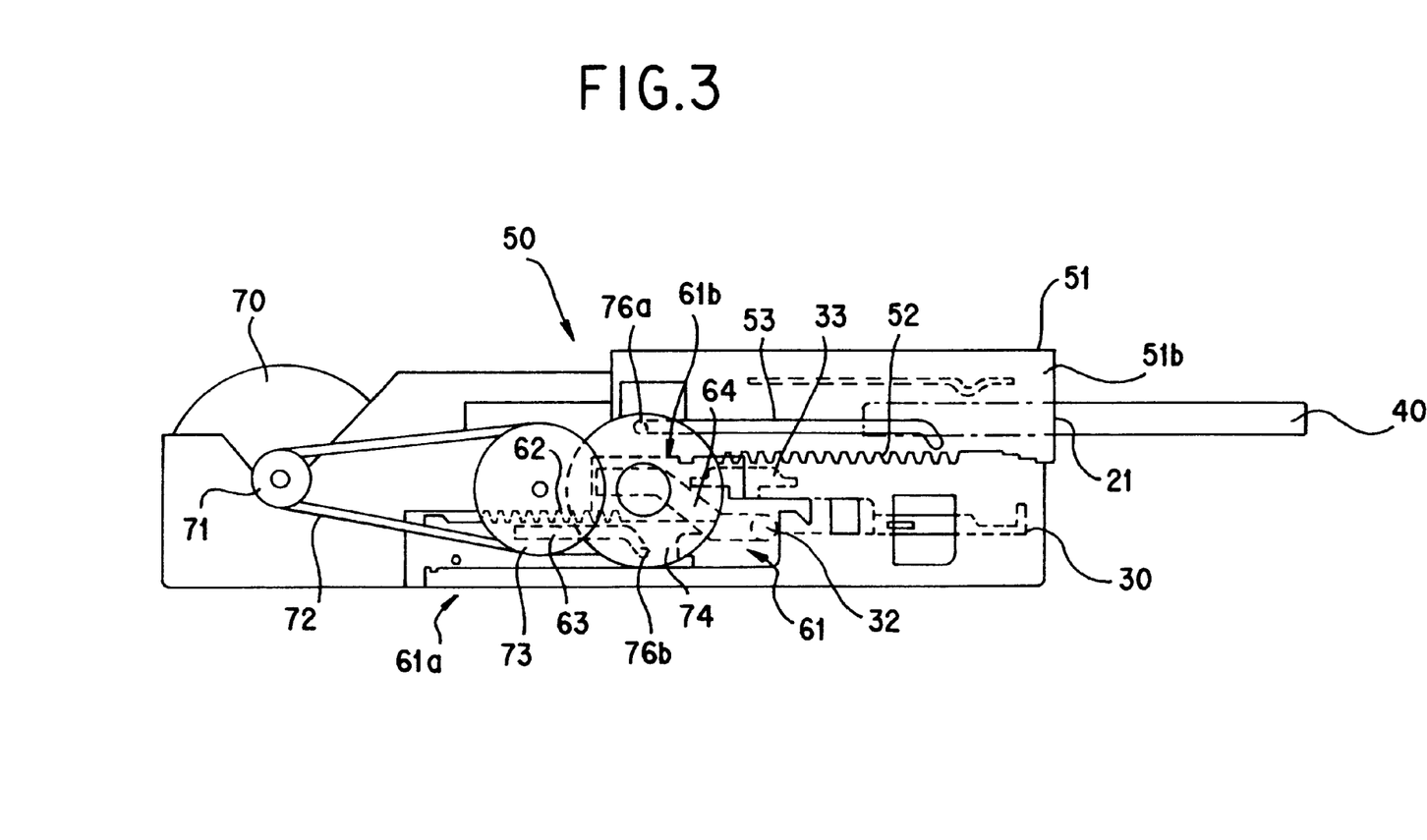
FIG. 3 is a side view schematically indicating the disc player of FIG. 1.

FIGS. 1–3 are explanatory views showing a disc player made according to a preferred embodiment of the present invention. In FIG. 1, reference numeral 10 is used to represent a disc player which has a cartridge holder 20 for holding a cartridge 40. A pivotable chassis 30 is provided within the cartridge holder 20 in a manner such that it is pivotable about a pseudo pivoting axis extending along one side of the cartridge holder 20. On the other side of the cartridge holder 20, there are provided a cartridge transporting system 50 for moving the cartridge 40, a driving system 60 for pivotably driving the pivotable chassis 30, a motor 70 for driving all of the above components.

In detail, the cartridge holder 20 is a frame structure having an elongated opening 21 on the front side thereof (on the right side in FIG. 1). The cartridge 40, which has a generally rectangular shape and contains an optical disc 41, is allowed to be inserted into or taken out from the cartridge holder 20 through the elongated opening 21.

Further, a protection shutter 42 is provided on the cartridge 40 adjacent to one side thereof, in a manner such that the shutter 42 can be driven in the same direction as the cartridge 40 being inserted into or taken out of the cartridge holder 20. In this way, when the cartridge 40 is in the disc player 10, the shutter 42 is in opened position so that the optical disc 41 is partially exposed. On the other hand, when the cartridge 40 is outside the disc player 10, the shutter 42 will be closed so as to protect the optical disc from any possible damage.

Moreover, on the surface of the cartridge holder 20 there is formed an adjusting hole 20a which permits insertion of an adjustment means which will be described in detail later.

In addition, on the above one side of the cartridge holder 20 there are formed a plurality of retaining grooves 22, so that a plurality of hinge members 31 of the pivotable chassis 30 may be engaged in these grooves 22 and supported thereon. In this way, the pivotable chassis 30 is allowed to pivot about the pseudo pivoting axis (not shown) by virtue the hinge members 31.

FIG. 2 is a front view schematically indicating the pivotable chassis 30 which includes an adjusting mechanism for adjusting a positional relationship between an optical pickup and a turntable.

Referring to FIG. 2, the pivotable chassis 30 is also formed into a frame structure, a plurality of the hinge members 31 are outwardly protruding members integrally formed on one side of the pivotable chassis 30. With the hinge members 31 engaged in the retaining grooves 22 of the cartridge holder 20, the pivotable chassis 30 can pivot about the pseudo pivoting shaft (not shown) within the cartridge holder 20. On the other side of the pivotable chassis 30, there is provided an engaging pin 32 protruding outwardly in the same plane as the chassis main body.

A turntable 33 for turning the optical disc 41 is provided on the center of the pivotable chassis 30. The turntable 33 is turned by a spindle-shaft 33a of a spindle motor (not shown). A guide shaft 35 and a worm gear 36 are mutually parallelly arranged along one side of the pivotable chassis 30, with one end of each being fixed thereon by means of a fixing member 34.

As shown in FIG. 2, secured on the other end of the worm gear 36 is a driven gear 36a which is engaged with a driving gear 36b. The driving gear 36b is driven by a small motor (not shown) mounted on the chassis 30, so that the gear 36a can be driven by the small motor by way of the driving gear 36b.

An optical pickup 37 is movably engaged through one side thereof with the worm gear 36 so as to be slidable on and along the guide shaft 35. An objective lens 37a is attached on an appropriate position of the optical pickup 37 so that the lens 37a is aligned with the spindle shaft 33a.

Further, an adjusting plate 38 is pivotably provided close to the rear side of the pivotable chassis 30, so as to serve as a principle member of an adjusting mechanism for adjusting the position of one end (near the turntable 33) of the guide shaft 35, in a manner such that said one end can move in a plane generally parallel to the recording surface of the optical disc 41.

The adjusting plate 38 may be made of a resin or a metal and includes a front portion 38A and a rear portion 38B. The front portion 38A will be covered up by a cartridge 40 when the cartridge 40 has been inserted into the cartridge holder 20, while the rear portion 38B is located on the outside of the inserted cartridge 40.

The front portion 38A of the adjust plate 38 includes a pivoting fulcrum 38a for permitting a free pivotal movement of the adjusting plate 38, and an engaging portion 38b for upwardly clamping one end of the guide shaft 35 in a direction generally perpendicular to the axis of the guide shaft 35. Further, the height of said one end of the guide shaft 35 is determined by a projection 30a formed on the pivotable chassis 30. Moreover, on the upper surface of the projection 30a clamping the guide shaft 35, there is provided a leaf spring 30b in an inclined manner with respect to the information recording surface of an optical disc 41, such that the guide shaft 35 tends to be urged on the projection 30a in a direction generally perpendicular to the extending direction of the guide shaft 35. In fact, the leaf spring 30b is in contact with the guide shaft 35, with its rear end fixed on the pivotable chassis 30.

On the other hand, the rear portion 38B of the adjusting plate 38 includes a fixing portion 38B1 having a hole 38d permitting insertion of a fixing screw 38c for fixing the adjusting plate 38, and a plastically deformable portion 38B2 which is plastically deformable during an adjustment operation which will be described later. Further, close to the base portions of both the above fixing portion 38B1 and the plastically deformable portion 38B2, there is provided an adjusting point 38e having a slot permitting insertion of a front tip end 39 of a minus type driver. Moreover, a fixing hole 38f is formed through the plastically deformable portion 38B2, and a fixing pin (not shown) is inserted in the fixing hole 38f so as to fix the adjusting plate 30 on the pivotable chassis.

In addition, further provided on the pivotable chassis 30 is a magnet head (not shown) which is movable up and down by virtue of a driving plate 61 (FIG. 3), as will be described in detail later.

Referring again to FIGS. 1 and 3, a cartridge transporting system 50 is used to move the cartridge 40 in a direction substantially parallel to the sliding direction of the shutter 42 on the cartridge 40. A carrier 51 is attached on the cartridge holder 20 so that it can move back and forth in the cartridge insertion direction. By virtue of such carrier 51, the cartridge 40 is allowed to smoothly move into and out of the cartridge holder 20.

In detail, the carrier 51 comprises a base plate 51a (FIG. 1) and a side plate 51b (FIG. 3), forming an L-shaped configuration when viewed along the cartridge insertion direction. In fact, the carrier 51 is allowed to slide along an elongated groove 23 formed on the cartridge holder 20 extending in the cartridge insertion direction.

FIG. 3 is a side view of the disc player 10. As shown in FIG. 3, the side plate 51b is formed extending along the side face of the cartridge holder 20. Further, the side plate 51b joins a carrier locking means (not shown) and a carrier hooking means (not shown). The carrier locking means is used to lock the carrier 51 on the cartridge holder 20, in a manner such that once the cartridge 40 is inserted into the cartridge holder 20, a locked state will be released so that the carrier 51 is enabled to move in the cartridge insertion direction. On the other hand, the carrier hooking means is used to engage the cartridge 40 when it is being inserted into the cartridge holder 20.

As shown in FIG. 3, the side plate 51b of the carrier 51 is further formed with an elongated rack portion 52 in its longitudinal direction. Such rack portion 52 is allowed to engage with a driving gear 75 which will be explained in detail later.

Further, a guide groove 53 is formed in parallel with the elongated rack portion 52 on the side plate 51b, located between the elongated rack portion 52 and the above carrier locking means. As shown in FIG. 3, the guide groove 53 has a downwardly inclined front portion bending toward the rack portion 52. In detail, the guide groove 53 is so formed that it permits insertion of an upper pin 76a of a change-over ring 76, as shown in FIGS. 1 and 3.

Referring again to FIGS. 1 and 3, on the same side of the cartridge holder 20, there is provided a driving plate 61 which is movable back and forth in the cartridge insertion direction, partially serving as a driving mechanism 60 for driving the above pivotable chassis 30.

In particular, the driving plate 61 includes a driving portion 61a and an operating portion 61b. The driving portion 61a is formed with a rack portion 62 engageable with a driving gear 75 which will be described in detail later.

Further, under the rack portion 62 is formed a guide groove 63 which is generally in parallel with the rack portion 62. The guide groove 63 also has a downwardly inclined front portion. Another pin 76b of the change-over ring 76 may be inserted in the guide groove 63.

On the operating portion 61b of the driving plate 61, there is formed a slightly Z-shaped guide groove 64. The engaging pin 32 of the pivotable chassis 30 is allowed to engage in the guide groove 64 so that said pin 32 may slide therealong. In this way, when the driving plate 61 is moving in its longitudinal direction, the pin 32 of the pivotable chassis 30 will be forced to move up and down in FIG. 3, thereby rendering the pivotable chassis 30 to pivot about the grooves 21 and the hinge member 31 (FIG. 1), causing the chassis 30 to get in contact with or move away from a predetermined elongated portion (not shown) within the cartridge holder 20.

In addition, a portion (not shown) of the driving plate 61 is so formed that it can serve to move a magnet head attached on the pivotable chassis 30.

A driving motor 70, which serves to provide a driving force for the chassis driving system 60 (for driving the pivotable chassis 30) and for the cartridge transporting system 50, is provided on the rear position of the cartridge holder 20.

Referring to FIGS. 1 and 3, the motor 70 has a driving shaft 70a on which is secured a pulley 71. Another pulley 73 is secured on the side wall of the cartridge holder 20. A belt 72 is attached around both the pulley 71 and the pulley 73, so that a V-shaped belt contour is formed therebetween. Referring to FIG. 1, a small gear 73a integrally molded with the pulley 73 is engageable with a large gear 74 supported on the side wall of the cartridge holder 20.

Further, on the inner side of the large gear 74 is coaxially attached another gear 75 which is engageable with both the rack portion 52 formed on the side plate 51b of the carrier 51 and the rack portion 62 formed on the driving portion 61a of the driving plate 61. As shown in FIGS. 1 and 3, a change-over ring 76 having an upper pin 76a and a lower pin 76b is coaxially provided on the inner side of the gear 75.

In detail, the upper pin 76a of the change-over ring 76 is positioned such that it can be inserted in the guide groove 53 of the carrier 51, the lower pin 76b can be inserted in the guide groove 63 of the driving plate 61.

Formed on an inwardly recessed surface of the above gear 74 are two half-circumference grooves (not shown). The driving gear 75 is formed with a projection 75a which may movably engage in the half-circumference grooves and may be stopped by end walls in each of such grooves.

The operation of the disc player 10 having the above-discussed structure made according to the present invention, especially the operation of the adjusting plate 38, will be described in detail below with reference to FIGS. 4 and 5.

At first, the cartridge 40 containing an optical disc 41 is inserted into the cartridge holder 20 of the disc player 10, so that the driving mechanism 60 for driving the pivotable chassis 30 and the cartridge transporting system 50 are driven by the driving motor 70 serving as a driving force, thereby enabling the optical disc 41 contained in the cartridge 40 to be clamped to the turntable 33 on the pivotable chassis 30. After that, the optical disc 41 is reproduced and a wave shape of a reproduced signal is detected, while at the same time it is detected whether or not the objective lens 37a is moving along a trace that is coincident with a predetermined trace 0 (FIGS. 4 and 5) in a radial direction of the optical disc 41.

Figure 4:
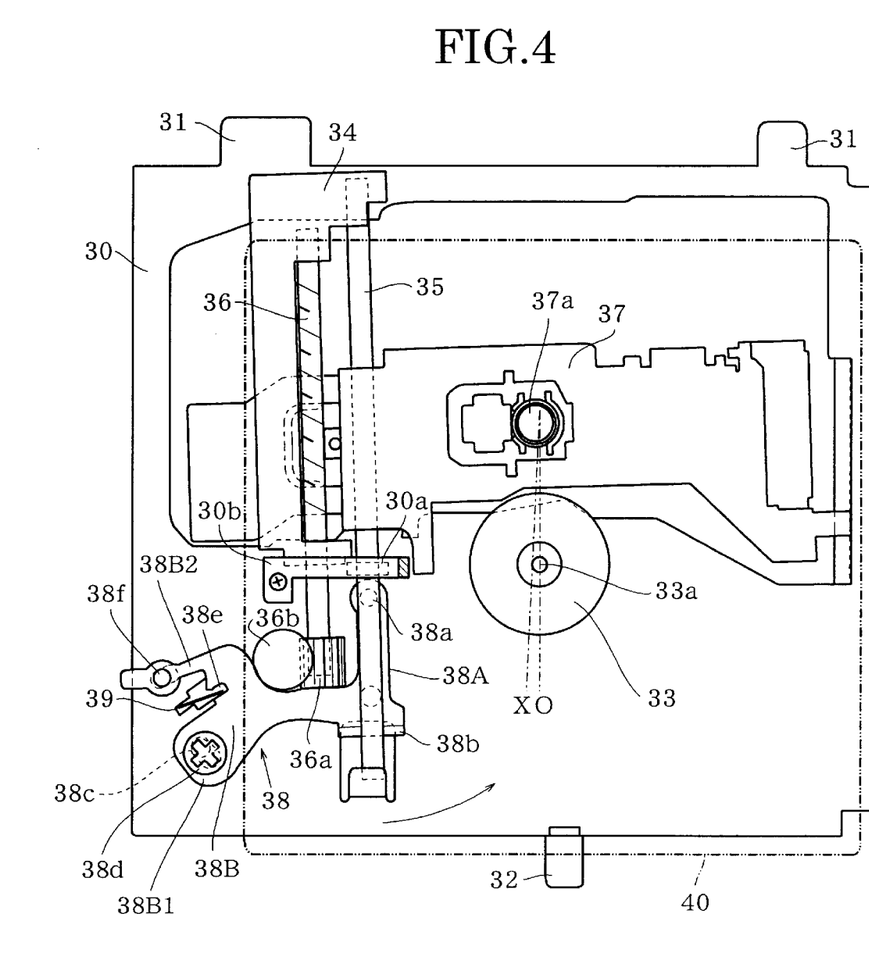
FIG. 4 is a front view schematically indicating a pivotable chassis of FIG. 2, illustrating how said adjustment is effected with the use of said adjusting mechanism.

As shown in FIG. 4, if it has been detected that the lens 37a is moving along a trace X that is not coincident with the predetermined trace 0 (i.e., on the left side of the trace 0), a tool (such as a screw driver) is inserted into an adjusting hole 20a formed on the upper surface of the cartridge holder 20, so as to loosen the fixing screw 38c secured in the fixing portion 38B1 of the adjusting plate 38, thereby rendering the adjusting plate 38 to be pivotable about the pivoting fulcrum 38a.

Then, the front tip end 39 of a minus screw driver is inserted into the adjusting point 38e of the adjusting plate 38, and the driver is driven in the clockwise direction in FIG. 4. In this way, the front tip end 39 of the driver will press the fixing portion 38B1 of the adjusting plate 38 toward the right in the drawing, so that the adjusting plate 38 itself is caused to pivot about the pivoting fulcrum 38a in the counter clockwise direction in the same plane. At this moment, since the fixing hole 38f formed in the protruding end of the plastically deformable portion 38B2 is fixed, only the plastically deformable portion 38B2 is forced to plastically deform.

In this way, with the pivoting movement of the adjusting plate 38, the guide shaft 35 engaged with and supported by the engaging portion of the adjusting plate 38, will be forced to pivot a little in the counter clockwise direction, with the fixing member 34 serving as the pivoting center, thereby rendering the optical pickup 37*a* to return to a correct trace 0.

At this moment, the leaf spring 30*b* in contact with and urging against the guide shaft 35, is capable of absorbing the guide shaft 35's moving amount happened during the above adjustment. Further, since the urging force of the leaf spring 30*b* may be maintained continuously, the above adjustment may be smoothly performed without any vibrations.

Next, once again, it is detected whether or not the objective lens 37*a* is moving along a trace that is coincident with a predetermined trace 0 in a radial direction of the optical disc 41, while the front tip end 29 of the minus type driver is slightly rotated to effect a fine adjustment, thereby ensuring that the objective lens 37*a* is moving along a trace that is coincident with a predetermined trace 0 in a radial direction of the optical disc 41.

If a wave shape of an output signal has indicated that the moving trace of the lens 37*a* is completely coincident with the predetermined trace 0, the fixing screw 38*c* is screwed up, thereby tightly securing the adjusting plate 38 on the pivotable chassis 30. Finally, the front tip end 39 of the minus type driver is withdrawn from the adjusting point 38*e*, thus completing the above adjustment.

Figure 5:
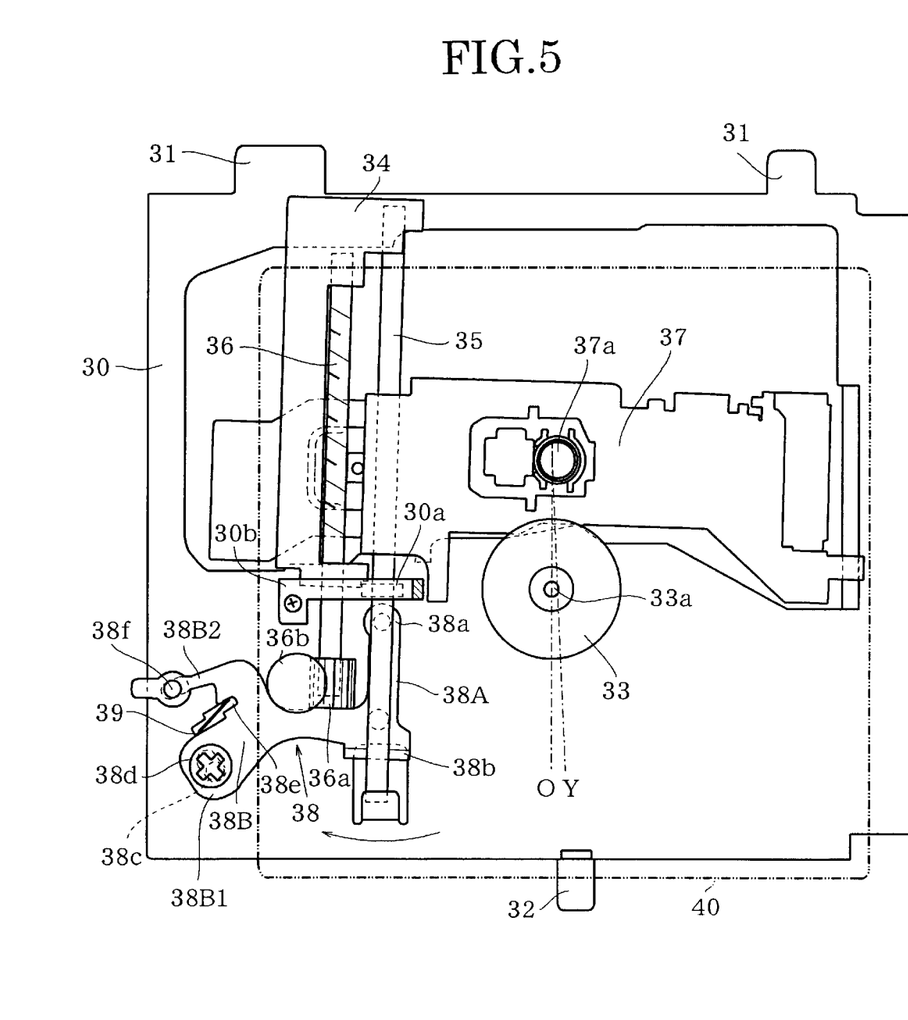
FIG. 5 is a front view schematically indicating a pivotable chassis of FIG. 2, illustrating how said adjustment is effected with the use of said adjusting mechanism.

On the other hand, as shown in FIG. 5, if it has been detected that the lens 37*a* is moving along a trace Y that is not coincident with the predetermined trace 0 in a different way than that in FIG. 4 (i.e., on the right side of the trace 0), a tool (such as a screw driver) is inserted into an adjusting hole 20*a* formed on the upper surface of the cartridge holder 20, so as to loosen the fixing screw 38*c* secured in the fixing portion 38B1 of the adjusting plate 38, thereby rendering the adjusting plate 38 to be pivotable about the pivoting fulcrum 38*a*.

Then, the front tip end 39 of a minus driver is inserted into the adjusting point 38*e* of the adjusting plate 38, and the driver is driven in the counter clockwise direction in FIG. 5. In this way, the front tip end 39 of the driver will press the plastically deformable portion 38B2 of the adjusting plate 38 toward the left in the drawing, so that the adjusting plate 38 itself is caused to pivot about the pivoting fulcrum 38*a* in the clockwise direction in the identical plane. At this moment, since the fixing hole 38*f* formed in the protruding end of the plastically deformable portion 38B2 is fixed, only the plastically deformable portion 38B2 is forced to plastically deform.

In this way, with the pivoting movement of the adjusting plate 38, the guide shaft 35 engaged with and supported by the engaging portion of the adjusting plate 38, will be forced to pivot a little in the clockwise direction, with the fixing member 34 as the pivoting center, thereby rendering the optical pickup 37*a* to return to a correct trace 0.

At this moment, the leaf spring 30*b* in contact with and urging against the guide shaft 35, is capable of absorbing the guide shaft 35's moving amount happened during the above adjustment. Further, since the urging force of the leaf spring 30*b* may be maintained continuously, the above adjustment may be smoothly performed without any vibrations.

Next, once again, it is detected whether or not the objective lens 37*a* is moving along a trace that is coincident with a predetermined trace 0 in a radial direction of the optical disc 41, while the front tip end 29 of the minus type driver is slightly rotated to effect a fine adjustment, thereby ensuring that the objective lens 37*a* is moving along a trace that is coincident with a predetermined trace 0 in a radial direction of the optical disc 41.

If a wave shape of an output signal has indicated that the moving trace of the lens 37*a* is completely coincident with the predetermined trace 0, the fixing screw 38*c* is screwed up, thereby tightly securing the adjusting plate 38 on the pivotable chassis 30. Finally, the front tip end 39 of the minus type driver is withdrawn from the adjusting point 38*e*, thus completing the above adjustment.

As is understood from the above description, with the use of the preferred embodiment of the present invention, the above adjusting point. 38*e* is located on the pivotable chassis 30 and is easily accessible even after the cartridge 40 has been inserted in position within the disc player 10, so that the desired adjustment may be performed from a position above the pivotable chassis 30 without any difficulty. In fact, such kind of adjustment is also allowed to be performed while an optical disc is just in a process of being reproduced, therefore render the adjustment operation simple and the adjustment efficiency improved without causing any inclination of the inserted disc. Moreover, since the adjusting plate of the adjustment mechanism is partially mad of a plastically deformable material which does not have a restoring tendency, once the above-described adjustment is completed, the adjustment result may be maintained forever without having to perform a second time adjustment, thereby ensuring an improved reliability for the disc player. In addition, since the above adjusting system is capable of adjusting even a commercially available non-adjusted optical pickup, a disc player manufacturer is allowed to have more choices in selecting an optical pickup for use in a disc player.

While the presently preferred embodiments of the this invention have been shown and described above, it is to be understood that these disclosures are for the purpose of illustration and that various changes and modifications may be made without departing from the scope of the invention as set forth in the appended claims.

What is claimed is:

1. A disc player, comprising:
   a turntable for rotatably holding an optical disc;
   an optical pickup for recording information into and reading information from the optical disc;
   an elongated guide shaft arranged in a predetermined moving direction of the optical pickup for guiding the optical pickup to move in said predetermined direction;
   a chassis for mounting the turntable, the optical pickup and the elongated guide shaft;
   a cartridge holder for receiving and holding a cartridge containing the optical disc;
   characterized in that:
      an adjustment mechanism is provided on the chassis for adjusting a positional relationship between the optical pickup and the turntable by moving one end of the elongated guide shaft in a plane which is generally parallel with a recording surface of the optical disc, wherein the adjustment mechanism includes an adjusting plate made of a resin or a metal, said resin or metal adjusting plate including a plastically deformable portion which is plastically deformable during said adjustment effected by the adjustment mechanism,
    wherein the adjusting plate includes a front portion and a rear portion, the front portion will be covered up by a cartridge after the cartridge has been inserted into the cartridge holder, while the rear portion is located on the outside of the inserted cartridge.

2. A disc player according to claim 1, wherein the adjusting plate is pivotably provided on one side of the elongated guide shaft close to the rear of the pivotable chassis.

3. A disc player according to claim 1, wherein the front portion o f the adjusting plate includes a pivot fulcrum permitting a free pivotal movement of the adjusting plate, and an engaging portion for upwardly clamping one end of the guide shaft in a direction generally perpendicular to the axis of the guide shaft.

* * * * *